United States Patent
Albrecht (10) Patent No.: US 10,462,982 B1
(45) Date of Patent: Nov. 5, 2019

(54) APPARATUS, SYSTEMS AND METHODS FOR DISPENSING AND LAYING A SHEET OF FILM MATERIAL

(71) Applicant: Willie L. Albrecht, Athens, WI (US)

(72) Inventor: Willie L. Albrecht, Athens, WI (US)

( * ) Notice: Subject to any disclaimer, the term of this patent is extended or adjusted under 35 U.S.C. 154(b) by 0 days.

(21) Appl. No.: 16/397,077

(22) Filed: Apr. 29, 2019

Related U.S. Application Data (60) Provisional application No. 62/796,168, filed on Jan. 24, 2019.

(51) Int. Cl.
| | | |
|---|---|---|
| *A01G 13/02* | (2006.01) | |
| *A01B 63/32* | (2006.01) | |
| *A01B 49/02* | (2006.01) | |
| *A01B 49/06* | (2006.01) | |
| *A01B 15/16* | (2006.01) | |

(52) U.S. Cl.
CPC .......... *A01G 13/0287* (2013.01); *A01B 15/16* (2013.01); *A01B 49/027* (2013.01); *A01B 49/06* (2013.01); *A01B 63/32* (2013.01); *A01G 13/0268* (2013.01); *A01G 13/0275* (2013.01)

(58) Field of Classification Search
CPC ............ A01G 13/0268; A01G 13/0275; A01G 13/0287
See application file for complete search history.

(56) References Cited

U.S. PATENT DOCUMENTS

| | | | | |
|---|---|---|---|---|
| 3,176,635 | A * | 4/1965 | Mabon | A01C 11/02 111/102 |
| 3,180,290 | A * | 4/1965 | Kappelmann | A01G 13/0287 111/141 |
| 3,559,599 | A * | 2/1971 | Hoadley | A01G 13/0287 111/200 |
| 4,092,936 | A | 6/1978 | Griffin et al. | |
| 4,285,161 | A * | 8/1981 | Kawasaki | A01G 13/0287 111/102 |
| 4,590,869 | A | 5/1986 | Steilen | |
| 4,601,248 | A * | 7/1986 | Beasley | A01B 49/06 111/140 |
| 4,771,570 | A | 9/1988 | Nyboer | |
| 5,022,333 | A * | 6/1991 | McClure | A01B 49/06 111/136 |
| 5,165,351 | A * | 11/1992 | Billings | A01C 5/068 111/199 |
| 5,226,376 | A * | 7/1993 | Shaw | A01G 13/0287 111/144 |
| 5,862,763 | A | 1/1999 | Dietrich, Sr. et al. | |

(Continued)

FOREIGN PATENT DOCUMENTS

| | | |
|---|---|---|
| EP | 2556746 | 2/2013 |
| EP | 2570335 | 3/2013 |

(Continued)

*Primary Examiner* — Alicia Torres
(74) *Attorney, Agent, or Firm* — Anthony J. Bourget (57) ABSTRACT

Methods, systems and apparatuses for applying a sheet of film material to the ground by utilizing first and second double disk openers to create first and second grooves in the ground and inserting the sheet into the grooves by use of a pair of press wheels which travel behind the disk openers and force the sheet into the grooves. Use of the disk openers accommodates a method of applying the sheet to planted seeds in non-tilled, frozen and/or near frozen soil conditions for increased crop yields.

20 Claims, 10 Drawing Sheets

(56) References Cited

U.S. PATENT DOCUMENTS

| | | | |
|---|---|---|---|
| 5,906,167 A * | 5/1999 | Miyachi | A01C 7/048 111/200 |
| 6,094,858 A | 8/2000 | Shine | |
| 7,451,712 B2 | 11/2008 | Bassett et al. | |
| 7,575,066 B2 | 8/2009 | Bauer | |
| 7,814,847 B2 | 10/2010 | Schilling et al. | |
| 2002/0174813 A1 * | 11/2002 | Hagny | A01C 7/006 111/189 |
| 2004/0255834 A1 * | 12/2004 | Schaffert | A01O 5/062 111/200 |

FOREIGN PATENT DOCUMENTS

| | | | | |
|---|---|---|---|---|
| FR | 2518365 A1 * | 6/1983 | | A01G 13/0287 |
| GB | 2130063 A1 * | 10/1982 | | |
| GB | 2130063 | 5/1984 | | |
| WO | WO9731523 | 4/1997 | | |

* cited by examiner

APPARATUS, SYSTEMS AND METHODS FOR DISPENSING AND LAYING A SHEET OF FILM MATERIAL

CROSS-REFERENCE TO RELATED APPLICATIONS

This application claims the benefit and priority of Provisional Patent Application Ser. No. 62/796,168, filed Jan. 24, 2019 for Apparatus, Systems and Methods for Dispensing and Laying a Sheet of Film Material, incorporated herein by reference in its entirety for continuity of disclosure.

BACKGROUND OF THE INVENTION

1. Field of the Invention

This invention relates to the field of film dispensing and laying apparatuses, systems and methods, and particularly to apparatus, systems and methods for dispensing and laying sheet film on crop lands.

2. Background Information

Apparatuses for dispensing a sheet of film material from a roll and laying the sheet on the ground are known. The film is used to facilitate growth of crops. Some systems lay the film behind planted seeds and automatically position edges of the unrolled film into furrows or cavities created during a tilling process, and then back-fill edges of the film with soil to hold the film in place. There are many examples of sheet film dispensing and laying apparatuses using the till-and-fill technique, some of which have been awarded patents, such as the devices shown in U.S. Pat. Nos. 6,094,858, 4,092,936, and UK Patent Application 2,130,063, among others.

While the foregoing show a variety of attempts to provide effective dispensing and laying of sheet film for use on crop land which have certain benefits, there is room for improvement.

SUMMARY OF THE INVENTION

Applicant has recognized problems with the prior apparatuses, including that prior apparatuses require tilling or scraping of soil to form a furrow, trench or cavity for insertion of the edges of the sheet. The prior devices and systems lack a no-till mechanism.

In one aspect the present invention includes a method of applying sheet film to a sliced groove within the soil. The groove is created by slicing. The slicing is accomplished by using a rotating disk or disks which form parallel grooves along a row of seed. The grooves are created in such a way as to minimize displacement of soil while still creating a sufficiently wide and deep groove to receive a pair of press wheels which press the sheet film into the grooves. The slicing disks operate to compress or compact the soil toward opposing walls to form the groove (as opposed to displacing or removal of soil to create a trench). In one aspect the grooves are formed by a pair of double disk openers. After the sheet film is inserted into the groove, a closing wheel is utilized to urge the compacted or compressed soil back to a pre-sliced position (or back to a nearly pre-sliced position) to assist in anchoring the sheet film into position.

In a further aspect the present invention utilizes a pair of double disk openers to slice the soil with minimum disruption (i.e., non-tilled) followed by insertion of the edges of the dispensed sheet film into the slices via narrow-profiled press wheels. Use of slicing methods and mechanisms provides improvement in terms of securing the sheet, and especially the unexpected benefit of allowing for application of the sheet early in a growing season (or prior to a traditional beginning of the growing season) and while the soil is partially frozen. No tilling is required for use of the present apparatus and methods, allowing farmers to plant early. Early application allows a user to achieve earlier and greater crop yields, and lengthens the growing season.

In a further aspect the invention includes a film applicator apparatus having a base frame configured to travel behind a pair of double disk openers and having a pair of press wheels rotatably connected to the base frame and configured to deliver a sheet of film material to the ground by pressing the sheet into grooves with the press wheels. The double disk openers form narrow grooves in the soil and the press wheels travel within the narrow sliced grooves to insert the sheet of film material. In one aspect the film is delivered from a roll which rests upon the press wheels and is rotated by activation of the press wheels. In other aspects the film is delivered from a roll positioned distal of the press wheels. In further aspects the distally positioned roll is activated electrically or hydraulically and controlled by a controller processing speed data and tension data received from sensors to assure the sheet of film is delivered at an appropriate rate and tension.

In a further aspect the invention pertains to a system for applying a sheet of film material to the ground in order to cover a row of seeds where the system includes at least a pair of double disk openers which slice grooves into the ground and an applicator positioned behind the openers and having a pair of press wheels to receive and press the sheet of film material into the grooves to cover the seeds. In some aspects the system is equipped with seed planting mechanisms or configured to trail behind a planter. In some aspects the applicator is connected directly to the double disk openers and is configured to rotate upward from the openers.

In a further aspect the invention includes a method of planting crops in partially frozen soil conditions, including slicing grooves into the soil and inserting a sheet of film material into the grooves to cover a row of seeds. In one aspect the slicing is accomplished using a pair of double disk openers to create parallel grooves. Opposite outer edge areas of the sheet are inserted into the spaced apart grooves to cover the seed. The sheet material is delivered to a pair of press wheels which pass through the parallel grooves. A roll of film may be positioned to contact the press wheels. In alternatives a film roll is supported by a tractor or pulling vehicle and the film is delivered to the press wheels for application by a film applicator.

The above partial summary of the present invention is not intended to describe each illustrated embodiment, aspect, or every implementation of the present invention. The figures and detailed description and claims that follow more particularly exemplify these and other embodiments and further aspects of the invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-15 aspects of apparatuses, systems and methods in accordance with the invention are shown. Apparatus 20 is a sheet film applicator which is configured to travel behind and/or connect to a pair of double disk openers 24, 26. A double disk opener is commonly used in farming to plant seeds in the resulting sliced groove which is formed by the opener. The disk openers 24, 26 are typically installed behind a tractor, a seeder, planter or other equipment to move the openers 24, 26 along the ground. The openers 24, 26 slice grooves 50, 52 into soil as they travel. Openers are commonly used in farming to plant seeds in the resulting grooves. Heretofore disk openers have not been utilized to create grooves for insertion of film. A variety of different styles and brands of double disk openers are available to create the grooves 50, 52. A third disk opener may be used to create a seed groove 51 (FIG. 9) for planting of a seed 51a in the soil. The planting of the seed 51a occurs prior to forming of the grooves 50, 52. After the grooves 50, 52 are sliced into the soil, a film or sheet 44 of film material is inserted into the grooves 50, 52 (FIG. 10). The film 44 covers the seed 51a. As described below, the film 44 protects and enhances growth of seeds covered by the film.

The film 44 is introduced into the grooves 50, 52 by press wheels 32, 34 of apparatus 20. Film 44 is held against the press wheels 32, 24 which travel within the grooves 50, 52. As the wheels 32, 34 rotate, the film 44 releases from the press wheels 32, 34 and remains within the grooves 50, 52. A closing wheel or wheels 60a, 60b trail behind the press wheels 32, 34 to close the grooves 50, 52 by urging the soil together to close the grooves 50, 52 and/or inserting soil into the grooves 50, 52. An additional finishing wheel or wheels 62a, 62b trail behind the closing wheels 60 for further finishing or manipulation of the soil to smooth the ground about the groove and/or to assure the film 44 is secured within the soil. Apparatus 20 passes along a length of soil having a row of planted seeds. The apparatus 20 dispenses film 44 to cover the row of planted seeds along the length of soil. The length of film 44 is secured into the ground along opposite edges of the film 44 to cover the planed seeds. Opposite ends of the sheet film 44 are buried at opposite ends of the planted row. A greenhouse effect is achieved beneath the secured film for enhanced growth of the seeds. In one aspect film 44 is biodegradable. The biodegradable film 44 will biodegrade at a rate based on the type of film 44 applied and based on weather conditions. Multiple applicators 20 may be utilized in conjunction with multiple disk openers 24, 26 to cover multiple rows of crops. The multiple applicators and disk openers may be connected together behind a single tractor or other pulling device, and multiple tractors and pulling devices may be used to plant large areas of fields.

The film 44 in one aspect is a deteriorating film material or a degradable or biodegradable layer of sheet or film material. In some aspects the film is transparent or substantially transparent, which enhances growing conditions for seeds planted in the soil beneath the film 44. The film provides a greenhouse effect, also increasing soil temperature and protecting from frost conditions. In some aspects the film includes tint or coloring or non-transparent regions as desired. In further aspects the film includes pin holes or slits to allow air and moisture to pass, or to allow growing plants to pass through the film. The film 44 is some aspects ranges from between 4 microns to 15 microns in thickness, although other thicknesses of film are acceptable in some applications. In some applications the thickness of the film lies in the range of 4 microns to 9 microns. In some applications the thickness of film lies in the range of 6 microns to 8 microns. In some advantageous applications the thickness of the film is approximately 7 microns. In one aspect the film 44 has perforations or openings or weakened regions to accommodate introduction of rain water, and openings for plants to extend therethrough. In some aspects the film is configured into a roll, and wound onto an elongated core element to form the roll. In some aspects a pair of bores concentric with the core element extend into the core element at opposite ends to receive spindles for rotation of the roll. Different types of spindles, such as an idler spindle or a tensioning spindle are received in the bores.

Figure 1:
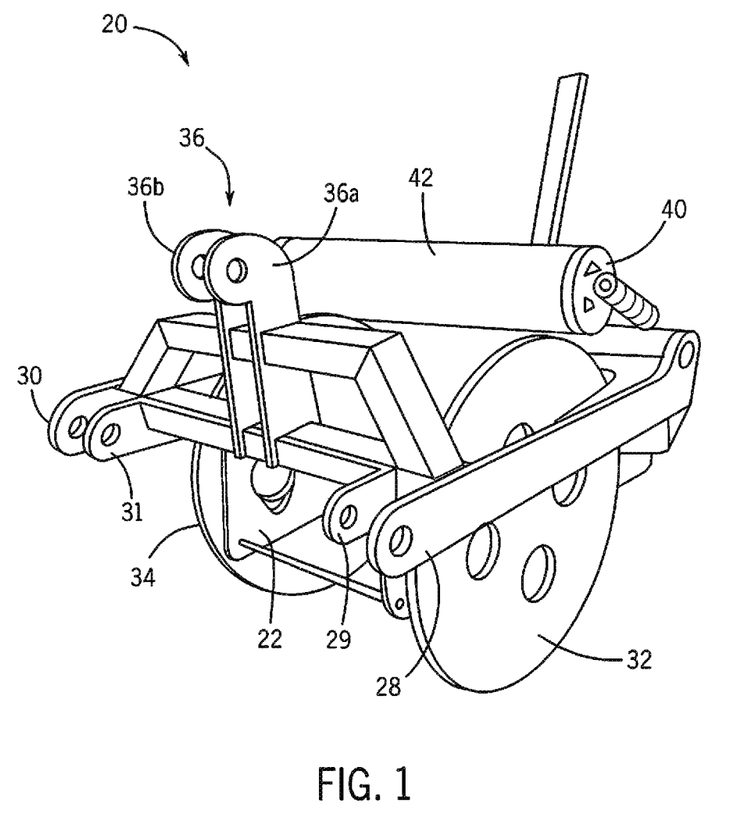
FIG. 1 is a perspective view of an apparatus made in accordance with one aspect of the present invention.
Figure 2:
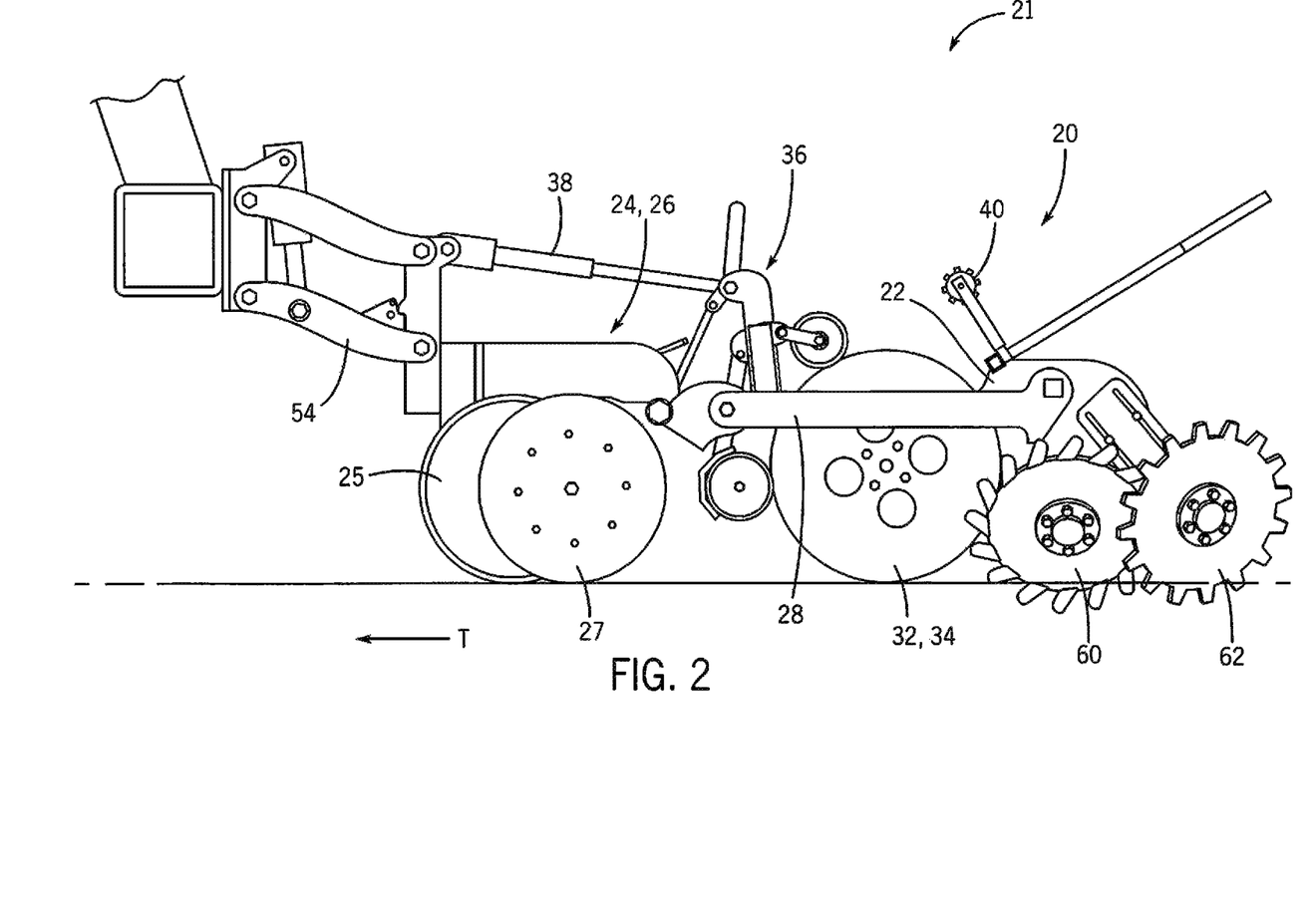
FIG. 2 is a side perspective view of the apparatus shown in FIG. 1 connected to a pair of double disk openers to form a further apparatus and system aspect of the invention.
Figure 3:
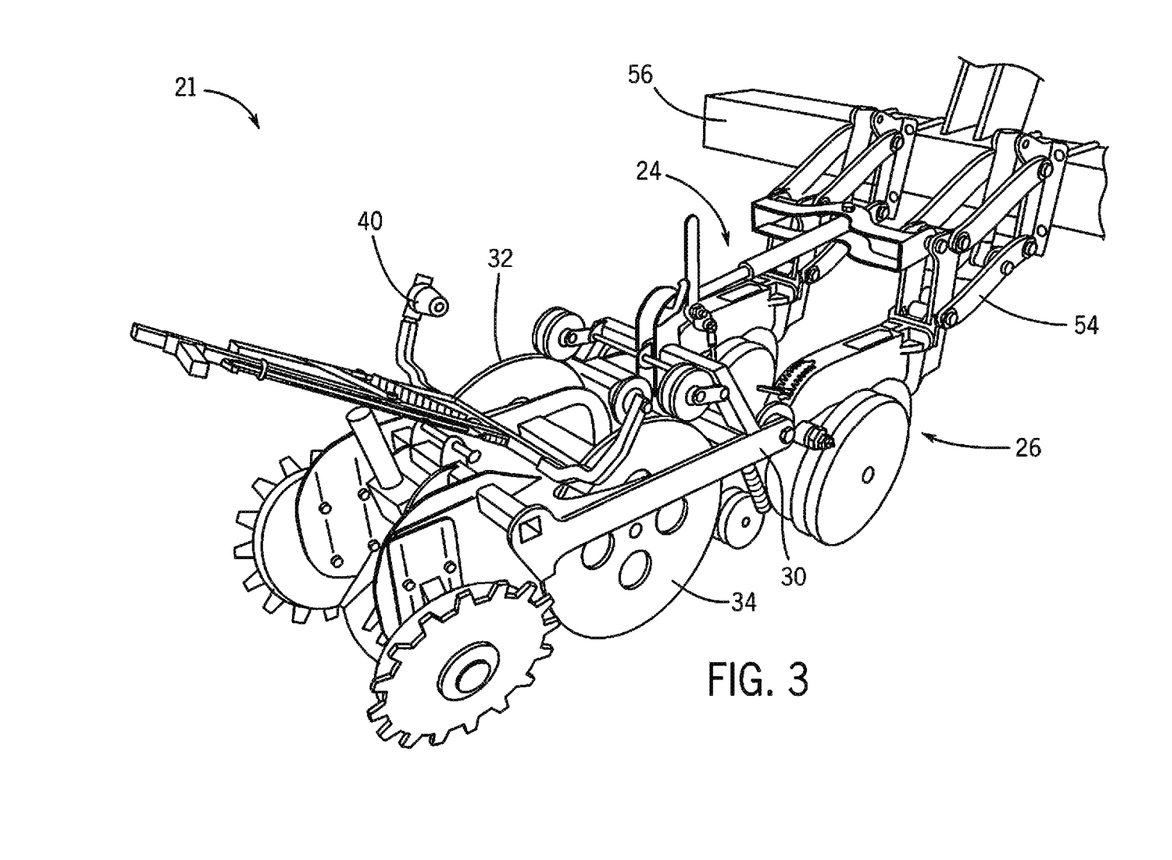
FIG. 3 is a reverse perspective view of the apparatus and system of FIG. 2.
Figure 4:
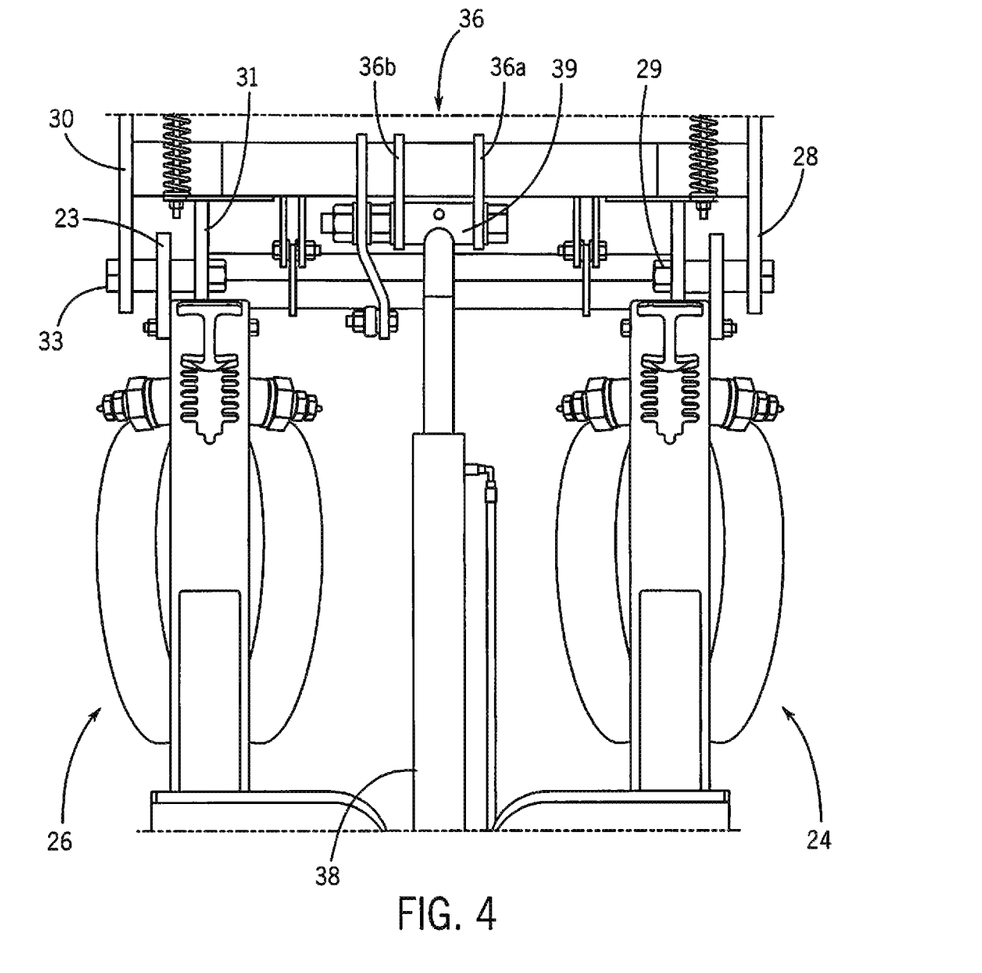
FIG. 4 is a partial top view of the system aspect of FIG. 2.
Figure 5:
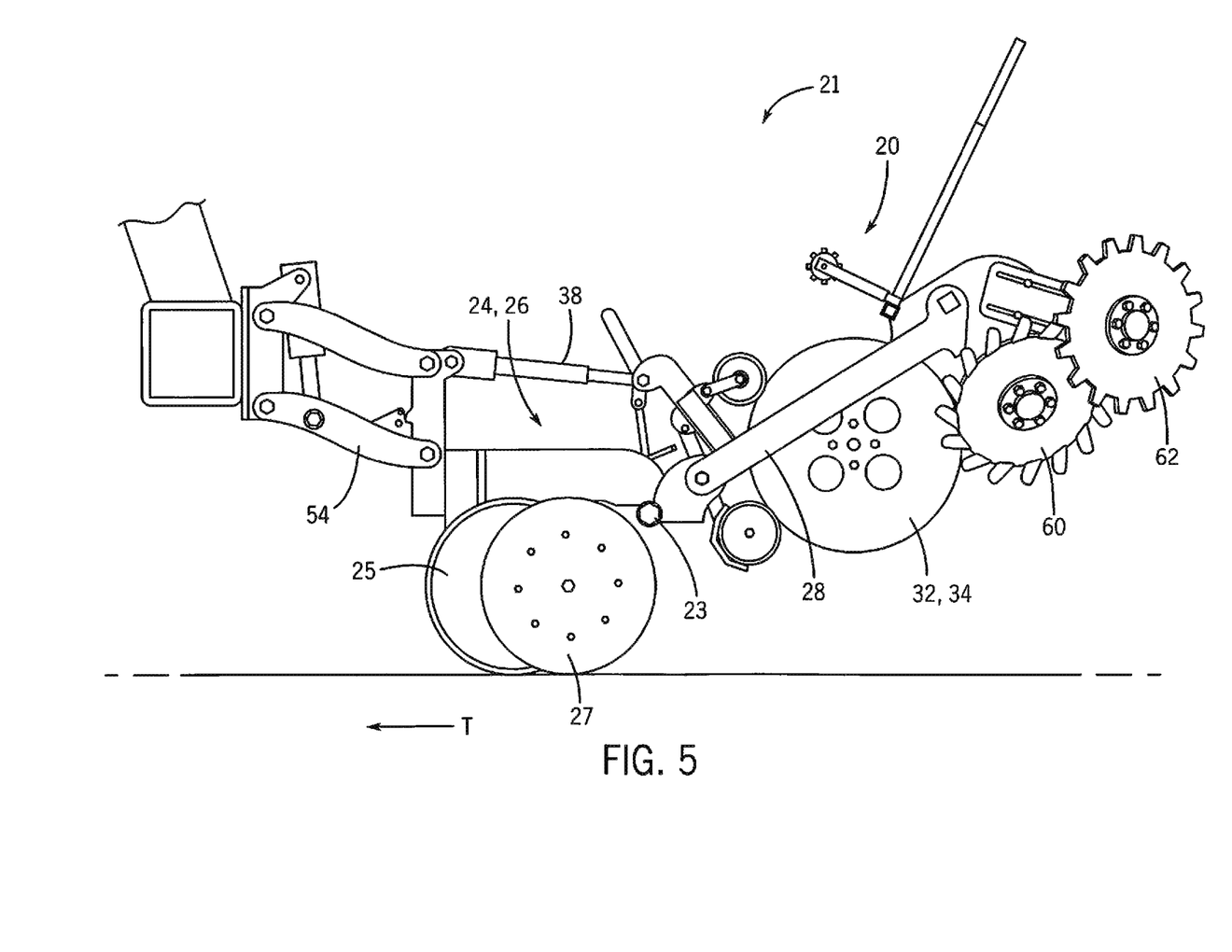
FIG. 5 is a side perspective view of the apparatus and system of FIG. 2 in a rotated orientation.

In reference to FIGS. 1-5, applicator 20 and system 21 aspects of the invention are further described. System 21 includes applicator 20 configured to travel behind a first double disk opener 24 and a second double disk opener 26. Openers 24, 26 are connected to a mount 54 which is in turn connected to a tool bar 56 or other structural support of a tractor or other equipment for moving system 21 and applicator 20. In one aspect applicator 20 rotatably connects to the disk openers 24. For instance, applicator 20 includes a base frame 22 which includes or to which is connected a first arm 28 and a second arm 30. Arms 28, 30 are configured to rotatably connect to disk openers 24, 26, respectively. For instance, with respect to FIG. 1 and FIG. 4, arm 30 connects to disk opener 26. FIG. 5 shows arm 28 connected to disk opener 24 at disk opener arm 23. Arm 23 is connected directly to disk opener 26. A pin or bolt 33 inserts through arm 30 and through disk opener arm 23. An arm supplement 31 (FIG. 1, FIG. 4) extends from applicator 20, and together with arm 30 form a gap to receive disk opener arm 23. Pin or bolt 33 passes through arm 30, disk opener arm 23 and arm supplement 31 to rotatably connect applicator 20 to disk opener 26. A similar structure is used to rotatably connect applicator 20 to disk opener 24 at arm 28. In one aspect applicator 20 includes a goose head 36 which extends upward from base frame 22. Goose head includes goose plates 36a, 36b having apertures to receive a pin to connect to a head 39 of hydraulic cylinder 38. An opposite end of cylinder 38 (opposite head 39) connects to the mount 54 or bar 56 of a tractor or other equipment. Activation of hydraulic cylinder 38 causes goose head 36 to move toward or away from mount 54 and causes applicator 20 to rotate about pins 33 at disk opener arms 23. FIG. 5 shows applicator 20 rotated upwards (counter-clockwise) with respect to disk openers 24, 26. Activation of cylinder 38 lowers applicator 20 toward the ground so that film 44 may be inserted by press wheels 32, 34 into the grooves 50, 52 created by disk openers 24, 26. Once grooves 50, 52 have been created, an operator may guide the press wheels 32, 34 into the grooves as the tractor or other planting equipment moves along in the direction of travel "T".

In other aspects applicator 20 is configured to travel behind disk openers 24, 26 without being connected directly to the openers 24, 26, so long as press wheels 32, 34 are aligned to travel within the grooves 50, 52 created by the disk openers 24, 26. For instance, applicator 20 may be connected directly to a bar 56 or other structure of a seeder or tractor or other machine which pulls applicator 20. In further aspects, applicator 20 is connected to different types or styles of double disk openers, and is not limited to those openers shown herein.

Figure 6:
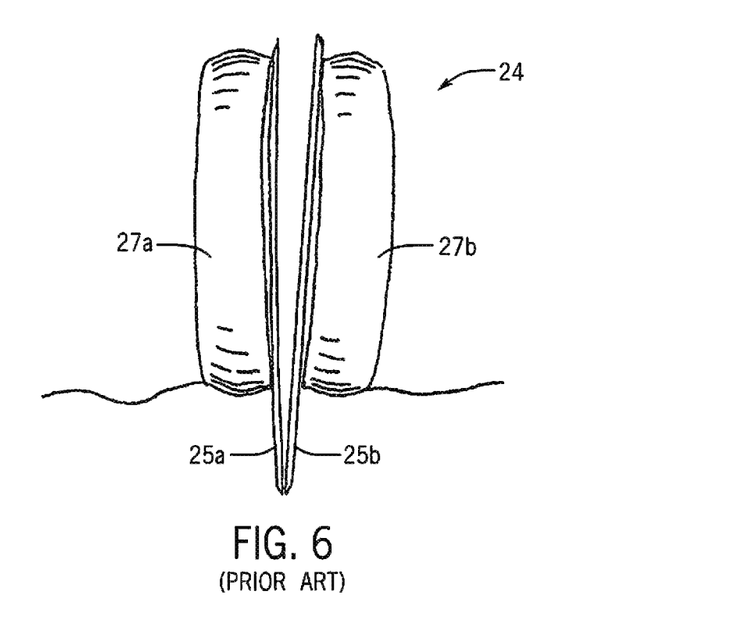
FIG. 6 is a partial cross-section view of a prior art double disk opener.

FIG. 6 is a partial illustration of a double disk opener 24 having a pair of disks 25a, 25b positioned between a pair of gauge wheels 27a, 27b. Disks 25 are configured to rotate and slice into the ground to form a groove 50. Disks 25 are generally flat planar disks with sharp end tips and are angled with respect to each other so as to form a generally V-shaped slice when traveling though the soil. The respective disks 25a, 25b may be oriented at different angles to form various types of grooves 50. In the present aspect the disks 25 are configured to align parallel along the direction of travel (arrow T) so that the disks avoid displacement, or avoids substantial displacement, of the soil. The double disk orientation is configured to avoid or minimize displacing soil or otherwise cutting out or turning over or tilling the soil.

Frozen or near-frozen soil or very wet soil typically cannot be tilled due to the difficulty (or impossibility) of displacing the soil. A double disk opener, however, is configured to operate in soil that is thawed and also soil that is near-frozen, partially frozen or which may contain some amount of frost or ice crystals. Double disk openers may also be used in soil having high moisture content where tilling is not possible given the high moisture content. While typical double disk openers are not used to slice frozen soil, many or most double disk openers may be used to slice thawed, partially frozen or near-frozen soils for use herein (and some soils which contain some amount of frost or ice crystals). Tilling of soil is often accomplished with use of a rotating disk, where the disk is angled with respect to the direction of travel. Yet if the soil is frozen or near frozen, tilling is impossible because the ground is just too hard. Farmers and gardeners appreciate when the ground is frozen solid and even when it is partially frozen. Unfrozen or partially frozen soil will have some ability to move or compress, unlike soil which is frozen solid. Slicing the soil with a double disk opener, however, does not involve displacing the soil as with tilling, and thus may be utilized with more severe soil conditions. Double disk openers can be used in soil conditions where tilling of the soil is not possible. Indeed, there is a spectrum of varying degrees of thaw or partial thaw, where working with frozen solid soil for planting is not possible at one end of the spectrum, with completely thawed soil for normal planting on the other end of the spectrum. The present invention allows for slicing of the soil and planting prior to having to wait until the soil is completely thawed, and is accomplished where the soil is still partially frozen or nearly frozen. The double disk openers 24, 26 are not angled with respect to the direction of travel in order to better slice through the soil and to avoid or minimize displacement or tilling the soil. Indeed, the double disk openers may at times partially compact the soil as in compacting a wall or portion of a wall 53 of a groove 50, 52. In some instances there may also be some slight disruption of soil where there are portions that are still frozen or slightly frozen or in cases where there are rocks or other debris in the line of travel.

Figure 7:
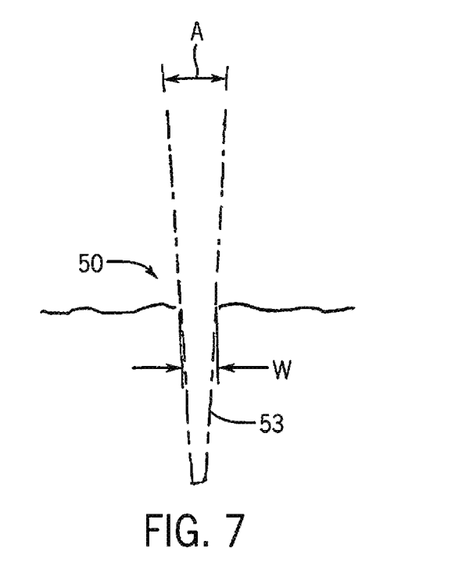
FIG. 7 is a cross-sectional view of the ground following slicing of the ground by a double disk opener.

FIG. 7 is an illustration of a groove 50 made using a double disk opener such as opener 24. The groove 50 is created by forcing the soil apart by slicing or compacting the soils at walls 53. Particularly, the individual disks 25a, 25b force the soil outward to form respective walls 53, 53. Soil is not removed or does not need to be removed or cut out from the ground in order to form the groove 50. Soil that is near frozen or partially frozen is compacted outward to form the walls and resulting groove 50. Some amount of soil displacement, albeit slight, may occur with a double disk opener in some applications. The depth of the groove 50 and the width W of the groove 50 are adjusted by altering the depth/height of the gauge wheels 27, and/or the pitch or angle A of the disks 27. FIG. 7 shows one example of the Width W and Angle A of groove 50. Different types or brands of double disk openers 24, 26 may be used to create different configurations of grooves 50, 52.

Groove 50 is formed having a Width W at the surface of the ground measuring between ½ inch and 3 inches, and in one aspect, Width W has a measure of between 1 inch and 1½ inches. In the present aspect, groove 50 has a Width W of 1 inch (which allows for less disturbance of soil compared to use of wider widths). Groove 50 is also formed with a depth measured from the surface of the ground of 1 inch to 5 inches. A common depth of groove 50 in the present application is between 2½ and 3 inches, which provides sufficient condition for securing film 44 therein. The angle A of groove 50 may vary from between 1 and 20 degrees. In some aspects the angle A of groove 50 ranges between 8 and 10 degrees, such as in the example shown. The forgoing dimensions may be varied to accommodate different soil conditions. Different off-the shelf double disk openers may be utilized (or retrofitted) for use with apparatus 20 and system 21. The bottom of groove 50 is formed in one aspect having a width of ¼ inches (generally where disk 25a meets disk 25b).

Figure 8:
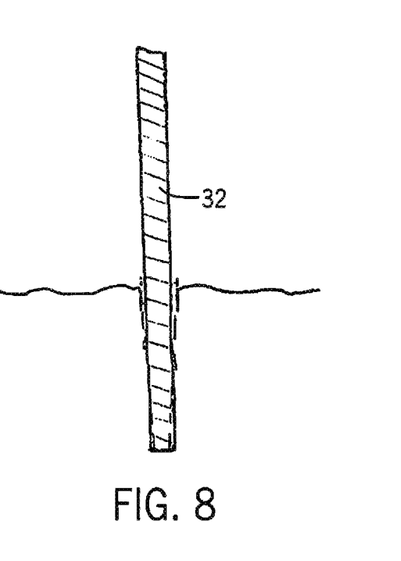
FIG. 8 is a partial cross-sectional view of the ground illustrating the apparatus of FIG. 1 with a press wheel inserted into a groove.

FIG. 8 illustrates one aspect of press wheel 32 inserted into groove 50 formed by disk opener 24. In one aspect wheel 32 has a width which matches the Width W of groove 50. In another aspect wheel 32 has a width which is slightly less than Width W (measured at the point of entry into the soil) so that film 44 is friction-fit within groove 50 between the outer sides of wheel 32 and the substantially vertical walls 53 of groove 50. Due to the narrowing of groove 50, the press wheel 32 will wedge the film 44 snugly into the groove 50. Depending on soil conditions, a portion of the inner wall 53 may be slightly compacted upon entry of the wheel 32 and film 44.

Press wheel 32 has a width of between ¼ and 1½ inches, and in one aspect a width of ½ inches in the example as shown. The press wheel 32 is a flat disk having slightly rounded outside edges for safety (so the edges are not too sharp). In the example shown regarding FIG. 7 and FIG. 8, the groove has a bottom width of ¼ inches, a depth of between 2½ and 3 inches, and a Width W of 1 inch. Insertion of press wheel having width of ½ inch causes the walls 53 of the lower or bottom portion of groove 50 to be further compacted (outward). For instance, the ½ press wheel 32 causes the walls 53 to conform to the contour of the combined press wheel 32 and film 44 inserted into groove 50. The weight of apparatus 20 causes press wheel 32 to compact within groove 50. Thus, the walls 53 toward a bottom portion of groove 50 will be oriented vertically or substantially vertically, with the walls 53 toward an upper portion of groove 50 being slightly angled as with Angle "A". Film 44 is positioned between press wheel 32 and walls 53, 53. In alternatives, film 44 may be configured and inserted such that outer edge areas 58 of the film 44 extend partially down inner wall 53, all the way down inner wall 53, partially up external wall 53', all the way up external wall 53', and beyond external wall 53'.

Figure 9:
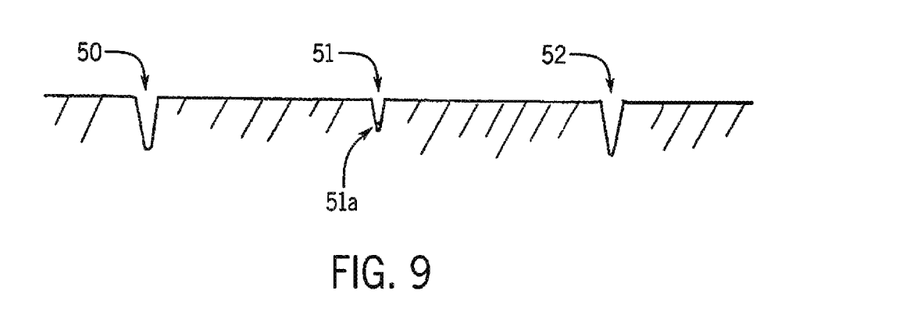
FIG. 9 is a cross-sectional view of the ground illustrating grooves and a seed groove in accordance with method aspects of the invention.
Figure 10:
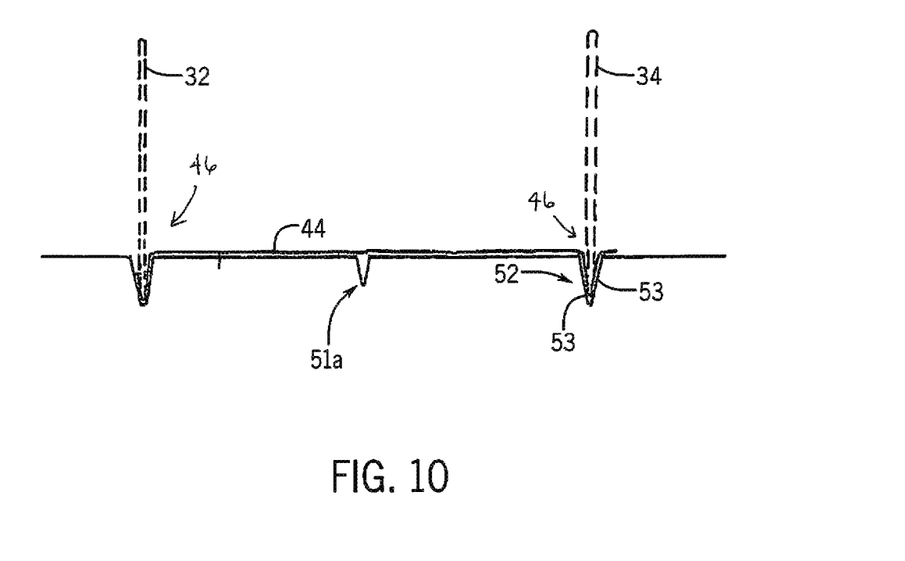
FIG. 10 is a cross-sectional view of the ground following application of a sheet film material to the grooves in accordance with the invention and showing press wheels in broken lines.

FIG. 9 is a cross-sectional view of the ground illustrating grooves 50, 52 having been created by passing of disk openers 24, 26. Seed groove 51 was prepared prior to passing of the disk openers so that a seed 51*a* may be placed within the groove 51. Fertilizer may also be inserted or applied along with the seed 51*a*. Other planting methods (i.e., not limited to planting via a disk opener) may be used to position a seed or a row of seeds along a row or line of crops to be prepared. In one aspect the seed groove 51 and/or seed 51*a* is positioned generally in a center area of the film 44. In one aspect, press wheels 32, 34 are separated 18 inches apart on center to correspond with grooves 50, 52 which are also positioned 18 inches apart on center. There is approximately 9 inches between seed groove 51 and respective grooves 50, 52. Other distances may be used for a desired spacing. The double disk openers may be spaced further apart (or closer together) as desired by using or adjusting U-bolts which secure the openers 24, 26 to mount 54, while press wheels 32, 34 may be adjusted to match the adjustment of the openers 24, 26 by using shims or other adjustment to the distance between press wheels 32, 34. The centering of the sheet 44 above the seed 51*a* provides for more efficient coverage and less room for misapplication of the sheet 44, especially in situations of planting on a side-hill. In some aspects the seed groove 51 may also be inserted into a mounded area of the soil.

FIG. 10 is a cross-sectional view of the ground illustrating grooves 50, 52 together with film 44 having been applied with press wheels 32, 34 shown in broken lines. Use of disk openers 24, 26 presents grooves 50 with minimal displacement (or no displacement depending on soil conditions) of soil so that sheet 44 may be efficiently laid into position with wheels 32, 34. As shown in FIG. 10, a portion of the sheet 44 positioned within groove 52 extends along the vertical walls 53, 53 and continues upward and outward in position above the ground. The amount of "overhang" of the sheet 44 may be adjusted as desired by stretching or pre-stretching the film, using various width of the film and/or adjusting the distance between the disk openers 24, 26 (and corresponding distances between press wheels 32, 34). In one aspect, film 44 may have a width of 26 inches so that sufficient film material is available for insertion into respective grooves 50, 52. The width of film 44 may be varied as desired to meet individual requirements. In one aspect the distance between press wheels 32, 34 (and corresponding distanced between the valleys of grooves 50, 52) is 18 inches on center. In one aspect, press wheels 32, 34 are connected via a common axle such that wheels 32, 34 rotate together (or in synch) to keep uniform displacement of the film 44 and keep it square as removed from the roller 40 and wheels 32, 34.

Figure 11:
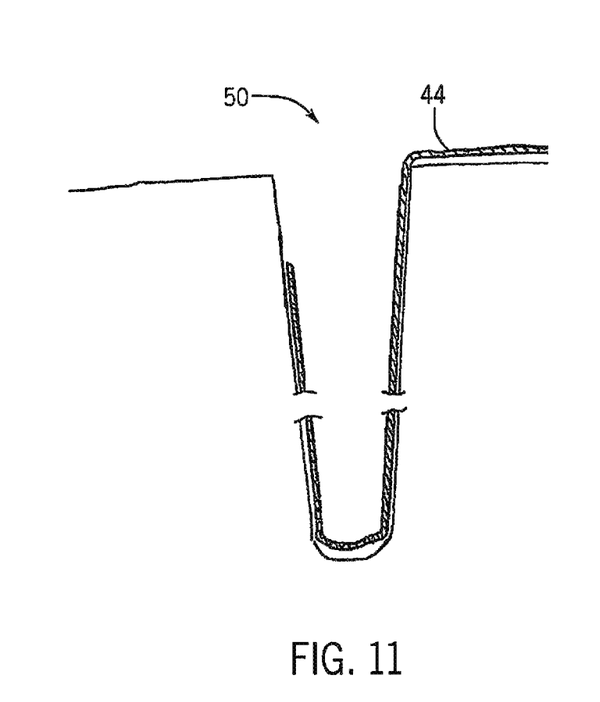
FIG. 11 is a cross-sectional view of the ground following application of a sheet film material to a groove in accordance with one aspect of the invention.

FIG. 11 is a partial cross-sectional view of the ground illustrating groove 50 together with a portion of film 44 inserted. The broken line is provided to illustrate the structure where the depth of the groove 50 varies.

The grooves 50, 52 are formed by slicing the soil as opposed to tilling or scraping. Particularly, the use of double disks 25*a*, 25*b* cause a slicing of the soil instead of a tilling or greater disruption of the soil as is realized if utilizing a single disk or a scraping device. A double disk opener utilizes two rotating disks which meet or nearly meet at a lower vertex or point and produce a groove having steep side walls.

Figure 12:
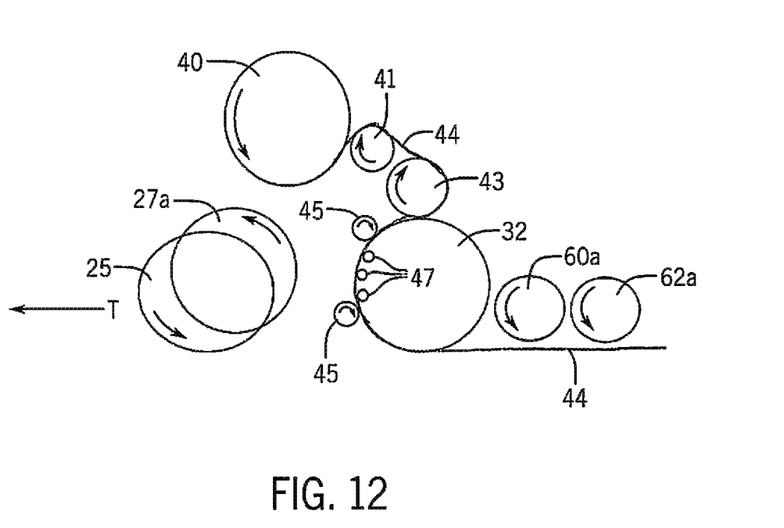
FIG. 12 is a diagrammatic side elevation view of apparatus and systems aspects of the invention with the direction of movement of components and sheet film material indicated by the arrows.

FIG. 12 is a diagrammatic side elevation view of an apparatus 20 and system 21 aspect of the invention with the direction of movement of components and sheet 44 film material indicated by the arrows. Particularly, a film roll holder 40 contains a roll of film 42 positioned above applicator 20 and above press wheels 32, 34. The roll holder 40 in one aspect is electrically (or hydraulically) driven. Holder 40 may also be ground driven (i.e., activated by movement about the ground using sprockets and chains or other mechanisms). Film 44 wound at roll 40 has a width that extends between and past respective press rollers 32, 34. A film tension roller 41 operates to keep proper tension or to sense the tension experienced by film or sheet 44 as it is displaced from roller 40. A film guide roll 43 receives the film 44 and guides it to the press wheels 32, 34. The film transitions along press wheels 32 via engagement with film guide wheels 45 which are spring loaded and hold the film 44 in tight engagement with the press wheels 32, 34. An additional guide wheel 45 or wheels are positioned toward a lower portion of press wheels 32, 34 to assure a secure engagement between the film 44 and wheels 32, 34. A roller 47 or series of rollers 47 are positioned between respective press wheels 32, 34 to assist film 44 in rotation about press wheels 32, 34 without undue sagging. Closing wheels 60 are positioned rearward of press wheels 32, 34 to assist in closing the grooves 50, 52, and optional finishing wheels 62 are positioned rearward of closing wheels 60 to provide further closing or finishing as needed. As shown in FIG. 12 disk 25 is positioned below gauge wheel 27*a* so that the double disks 25*a*, 25*b* of double disk opener 24 may slice the groove 50 in the ground for insertion of film 44 by press wheel 32. As shown, gauge wheel 27 contacts the ground surface while disk 25 projects downward to slice the soil.

In alternatives, roll holder 40 may be positioned immediately over press wheels 32, 34. For instance, roller 43 may instead represent film roll 42 having film 44 (i.e., roller 43 may itself comprise a roll of film). In one instance where film is rolled at roller 43, having an 8-11 inch diameter of film 44, for instance, will weight approximately 70 pounds. The roll 43 is positioned directly on the press wheels 32, 34, and as the wheels rotate, so does roll 43, thereby releasing film 44. Where the weight of roll 43 is greater than about 70 pounds, the area of the film 44 positioned on the press wheels 32, 34 (such as outer edge areas 58 of the sheet 44) will tend to be deformed due to being forced by gravity against the narrow press wheels 32, 34, which is undesirable. Thus, a smaller size roll 43 weighing about 70 pounds or less is utilized. In alternatives, the film roll is positioned at roller 40 (or roller 40 is a film roll) so that a heavier roll may be supplied for laying longer sheets upon a planted row of crops. Roller 40 may accommodate a roll of film weighing several hundreds or thousands of pounds, providing greater output without having to frequently reset the apparatus 20 and methods of application with supplemental rolls of film 44.

In one aspect film roll holder 40 or roll of film 42 is a large diameter roll of film 44 supported by mount 54 or tool bar 56 or directly to a tractor or other equipment. The longer roll of film 44 accommodates application along long rows of crops without having to cut and splice, thereby increasing the rate of applying the film 44 and planting seed. In further aspects a turret configured to hold multiple rolls of film is positioned above apparatus 20, such as at tractor or via a tool bar 56 or other appropriate mount to provide a convenient supply of film 44. A sheet extends from the larger film roll 40 to a tension roller and/or guide roll 43 for delivery to the press wheels 32, 34.

In a further aspect, pressure, tension and speed transducers and/or sensors are provided, together with a controller, to measure and receive data and automatically adjust the speed of rotation of roller 40 and tensioner 41 (and other rollers and wheels of apparatus 20 as appropriate). Thus, instead of having film roll activated by rotation of press wheels 32, 34, the film roll 40 is activated (unwound) and the rate of delivery adjusted based on the data from sensors. The controller includes a display and in one aspect is positioned at a cab of the tractor or other equipment pulling the apparatus 20 and/or system 21. In further aspects controller includes memory, software program, computer chip and communication systems (wired and wireless) for monitoring and controlling operation of apparatus and system 21.

Figure 13:
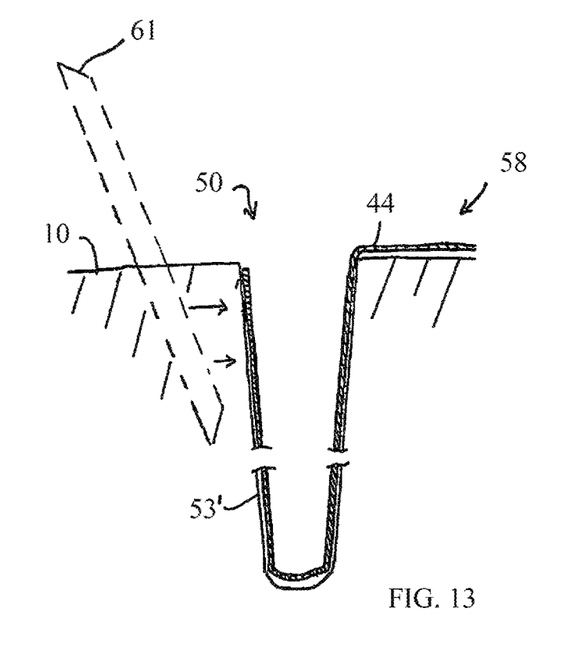
FIG. 13 is a partial cross-sectional view of the ground illustrating a groove together with a portion of film 44 inserted, and together with a finger of a closing wheel shown in broken lines.
Figures 14, 15:
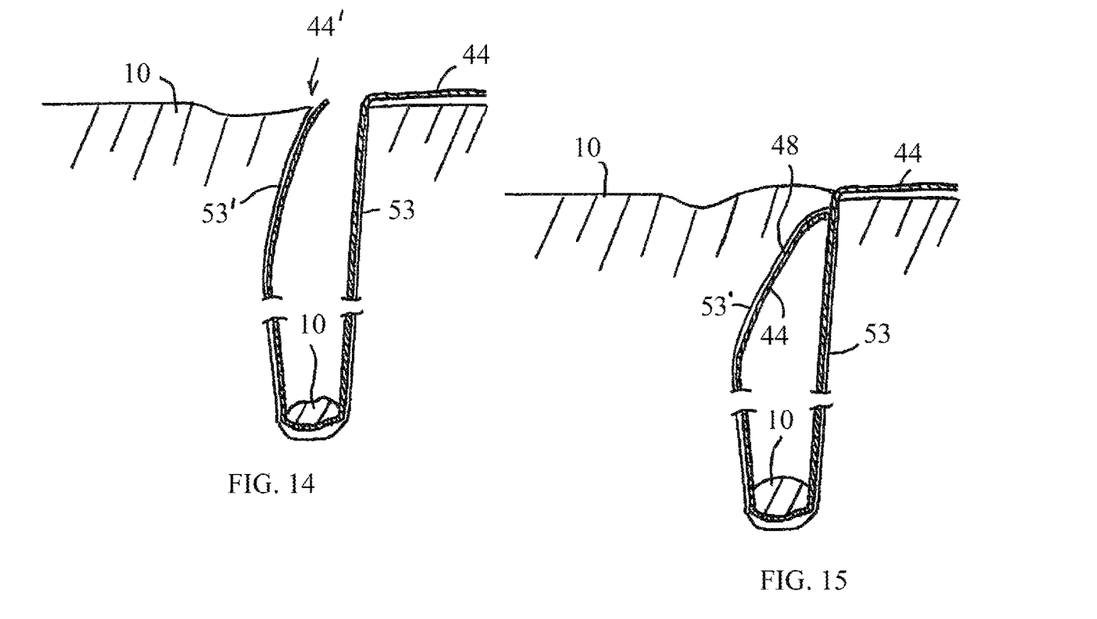
FIG. 14 is a partial cross-sectional view illustrating the ground and components after passing of a closing wheel.
FIG. 15 is a partial cross-sectional view illustrating the ground and components after passing of a finishing wheel.

FIG. 13 is a partial cross-sectional view of the ground illustrating groove 50 together with a portion of film 44 inserted, and together with a finger 61 of a closing wheel 60a shown in broken lines. The closing wheel 60a may be oriented at a slight angle (as desired) with respect to the direction of travel T in order to urge the soil 10 toward external wall 53'. The force exerted by finger 61 upon the compacted soil is depicted by the arrows shown in FIG. 13. The compacted soil was previously compacted by disk 25a of double disk opener 24, which soil forms external wall 53'. The angling of closing wheel 60 may also be configured to displace some amount of soil 10 into groove 50 as shown in FIG. 14. FIG. 14 also shows the external wall 53' having been urged toward the opposite wall 53 due to passing of finger 61. With the urging of the soil and movement or return of external wall 53' toward wall 53, film 44 is also drawn closer to wall 53. In some cases a portion or terminal area 44' of film 44 will remain visible as shown in FIG. 14. Terminal area 44' may extend partially above the ground surface or be otherwise visible. Where a longer width of film 44 is used (such as is shown in the right side of FIG. 10 with respect to the film 44 extending beyond groove 52), the terminal area 44' is more likely to remain visible upon initial insertion into the groove. An operator may vary the width of the film 44 for desired applications. In the application shown in FIGS. 13-15, the width of film 44 accommodates one instance of wrapping and securing the edge of film 44 within groove 50.

The closing of the wall 53' may position at least some soil into the groove 50 and upon film 44 to tightly secure film 44 into position. Due to the relatively sharp angles of wall 53 and coverage of film 44 with some amount of soil 10, the film 44 is tightly secured into position. Even a relatively small amount of soil 10 positioned within the groove 50 (as in FIG. 14) and on top of film 44 provides a surprisingly tight connection and without the need for major soil displacement or tilling. Closing wheel 60a may be oriented at an angle that is not parallel to the direction of travel T, thus accommodating a slight disturbance of soil to close, fill, or partially fill groove 50.

A finishing wheel 62 is also provided, and may also be oriented at an angle that is not parallel to the direction of travel T, thus accommodating smoothing of the soil above groove 50 for a smooth or a flattened appearance. FIG. 15 shows application of a finishing wheel 62 (applied similar to the closing wheel 60) to further urge wall 53' toward wall 53. Finishing wheel 62 also urges soil 10 into groove 50 (see bottom of groove with larger mass of soil 10) and to cover film 44. Particularly, FIG. 15 shows external wall 53' abutting the film 44 at wall 53 and completely covering film 44 within groove 50. A small amount of soil 10 is positioned above groove 50 and provides a smooth or finished appearance. The combination of soil positioned within groove 50 (at an upper side of the sheet 44 and at a bottom of the groove), and also where the sheet 44 wraps back upon itself (at least partially) with further soil positioned on the sheet (at an underside of the sheet 44 toward the surface) creates a locking structure to further secure film 44 into position. Because the soil had only recently been compressed at walls 53, 53' to form groove 50, relatively small force is needed to urge wall 53' toward wall 53.

A hydraulically operated film cutter or cutting mechanism is positioned at a rear of the base frame 22 to selectively cut the film 44 after it has been dispensed. The cutter is used to secure a first end of the film 44 at a beginning of a planted row, and then again at the end of the planted row to seal the opposite ends of the sheet 44 overlaying the covered row. The cutter includes a flap which rotates downward to cut the film while also pressing the film into the ground. The ground pressing action also causes soil to spill upon the film to hold the film into position after the flap is lifted.

In further aspects, a method of applying a sheet of film material 44 to the ground along a direction of travel T includes utilizing a first disk opener 24 to slice a first groove 50 in the ground, the first disk opener having a rotating disk oriented along a plane aligned parallel or substantially parallel to the direction of travel T, and inserting the film 44 into the first groove. The inserting step in one aspect includes using a double disk opener. The method further includes utilizing a second opener, including a double disk opener, to create a second groove 52 in the ground and inserting the sheet 44 into the second groove. Inserting the film 44 positions the film over a seed or seeds delivered to the ground. In one aspect, the seed or seeds are delivered to a groove 51 in the ground. In one aspect the seed is delivered to the ground before the step of positioning the sheet of film 44 over the seed or into the grooves. In one aspect the film 44 is pressed into grooves 50, 52 by press wheels 32, 34 which travel behind double disk openers 24, 26. The method in one aspect is applied to ground that is partially frozen.

A further method aspect includes planting crops in partially frozen soil, including slicing first and second grooves 50, 52 into the partially frozen soil and inserting a sheet of film material 44 into the grooves to cover a seed 51a. In one aspect the slicing includes utilizing a first double disk opener 24 to create the first groove and a second double disk opener 26 to create the second groove 52. Inserting a sheet of film 44 includes inserting opposite outer edge areas 46, 46 of the sheet 44 into the grooves 50, 52. A step in inserting the film into the grooves includes using first and second press wheel to push the film into the grooves. In one aspect, the press wheels travel behind and together with the double disk openers. In one aspect the film 44 is a deteriorating film material.

It should be understood, of course, that the foregoing relates to exemplary embodiments of the invention and that modifications may be made without departing from the spirit and scope of the invention as set forth in the following claims.

What is claimed is:

1. A film applicator, comprising:
   a base frame positioned behind a first double disk opener and a second double disk opener;
   a first press wheel and a second press wheel each rotatably connected to the base frame; and
   a film roller positioned above the base frame and configured to supply a sheet of film to the first press wheel and second press wheel such that film delivered from the film roller passes at least partially around the first press wheel and second press wheel.

2. The applicator of claim 1 where the first double disk opener includes a pair of disks configured to slice a first groove into soil, the second double disk opener includes a pair of disks configured to slice a second groove into soil, the first press wheel configured to pass within the first groove and the second press wheel configured to pass within the second groove.

3. The applicator of claim 1 where the base frame includes a first arm configured to rotatably connect to the first double disk opener and a second arm configured to rotatably connect to the second double disk opener.

4. The applicator of claim 3 where the base frame includes a third arm configured to connect to a hydraulic cylinder such that activation of the cylinder causes the first arm to rotate at the first double disk opener and the second arm to rotate at the second double disk opener.

5. The applicator of claim 2 where the first double disk opener is configured to create a first groove having a groove depth extending below the ground surface greater than a groove width at the ground surface.

6. The applicator of claim 5 where the first groove is defined by opposing walls forming an angle of between 1 and 20 degrees, a depth of between 1 and 5 inches and a width at the ground surface of between ⅜ and 3 inches.

7. The applicator of claim 2 where the first double disk opener includes a pair of gauge wheels to control the depth of the first groove and the second double disk opener includes a pair of gauge wheels to control the depth of the second groove.

8. The applicator of claim 2 configured to be transported along a direction of travel and where the pair of disks of the first disk opener are oriented substantially parallel to the direction of travel.

9. The applicator of claim 1 where the film roller includes a roll of film positioned in contact with the first and second press wheels.

10. The applicator of claim 1 where the film roller receives film from a distal roll of film, the distal roll of film configured to activate in response to a controller.

11. A system for applying a sheet of film material to the ground, the system comprising:
    a first double disk opener configured to slice a first groove in the ground;
    a second double disk opener configured to slice a second groove in the ground; a film roller; and
    an applicator positioned behind the first double disk opener and the second double disk opener and having a first press wheel and a second press wheel configured to receive the sheet of film material from the film roller, the first press wheel configured to force the sheet into the first groove, the second press wheel configured to force the sheet into the second groove.

12. A method of applying a sheet of film material to the ground along a direction of travel, the method comprising:
    utilizing a first double disk opener to create a first groove in the ground, the first double disk opener having a rotating disk oriented along a plane aligned substantially parallel to the direction of travel; and
    inserting the sheet of film material into the first groove.

13. The method of claim 12 further comprising utilizing a second double disk opener to create a second groove in the ground and inserting the sheet of film material into the second groove.

14. The method of claim 13 where the step of inserting the sheet of film material into the first groove and into the second groove positions the sheet of film material over a seed delivered to the ground.

15. The method of claim 13 further comprising a step of delivering a seed to the ground prior to a step of positioning the sheet of film material over the seed, the ground being partially frozen.

16. The method of claim 13 further comprising dispensing the sheet of film material from a roll positioned above a first press wheel and a second press wheel, the first press wheel configured to press the film into the first groove and the second press wheel configured to press the film into the second groove.

17. A method of planting crops in partially frozen soil, the method comprising:
    slicing first and second grooves into the partially frozen soil; and
    inserting a sheet of film material into the grooves to cover a seed.

18. The method of claim 17 where the step of slicing includes utilizing a first double disk opener to create the first groove and a second double disk opener to create the second groove and where the step of inserting a sheet of film includes inserting opposite outer edge areas of the sheet into the grooves.

19. The method of claim 18 where the first groove is defined by opposing walls forming an angle of between 1 and 20 degrees, a depth of between 1 and 5 inches and a width at the soil surface of between ⅜ and 3 inches.

20. The method of claim 18 where the sheet of film is comprised of deteriorating film material, and the step of inserting the sheet of film includes pressing the film into the first and second grooves with first and second press wheels which travel behind and together with the first and second double disk openers.

\* \* \* \* \*